(12) United States Patent
Sato

(10) Patent No.: US 10,800,294 B2
(45) Date of Patent: Oct. 13, 2020

(54) CLUTCH UNIT

(71) Applicant: NTN CORPORATION, Osaka (JP)

(72) Inventor: Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/325,461

(22) PCT Filed: Jul. 31, 2017

(86) PCT No.: PCT/JP2017/027602
§ 371 (c)(1),
(2) Date: Feb. 14, 2019

(87) PCT Pub. No.: WO2018/042990
PCT Pub. Date: Mar. 8, 2018

(65) Prior Publication Data
US 2019/0210489 A1    Jul. 11, 2019

(30) Foreign Application Priority Data
Aug. 30, 2016    (JP) .................................. 2016-168138

(51) Int. Cl.
*B60N 2/16*    (2006.01)
*F16D 41/08*    (2006.01)
(Continued)

(52) U.S. Cl.
CPC ................ *B60N 2/165* (2013.01); *A47C 7/02* (2013.01); *B60N 2/16* (2013.01); *B60N 2/168* (2013.01);
(Continued)

(58) Field of Classification Search
None
See application file for complete search history.

(56) References Cited

U.S. PATENT DOCUMENTS 3,203,519 A * 8/1965 Schwerdhöfer ......... F16D 41/30
192/217.6
7,032,731 B2 * 4/2006 Kim ....................... B60N 2/167
192/15

(Continued)

FOREIGN PATENT DOCUMENTS

JP    5207779    6/2013
JP    2013-224692    10/2013

OTHER PUBLICATIONS

International Search Report dated Oct. 31, 2017 in International (PCT) Application No. PCT/JP2017/027602.
(Continued)

*Primary Examiner* — Colby M Hansen
(74) *Attorney, Agent, or Firm* — Wenderoth, Lind & Ponack, L.L.P.

(57) ABSTRACT

A clutch unit includes a lever-side clutch part to control transmission and interruption of rotational torque input through lever operation, and a brake-side clutch part to transmit the rotational torque from the lever-side clutch part to an output side, and interrupt rotational torque reversely input from the output side. The brake-side clutch part includes a cover constrained in rotation, an output shaft to output the rotation, an inner ring to receive the rotational torque input from the lever-side clutch part, and a cylindrical roller to control interruption of the rotational torque from the output shaft and transmission of the rotational torque from the inner ring through engagement and disengagement between an outer ring and the output shaft. The inner ring includes a slide gear which meshes with the cover during interruption of the rotational torque and is released from the meshing state during transmission of the rotational torque.

3 Claims, 8 Drawing Sheets

(51) Int. Cl.
*A47C 7/02* (2006.01)
*F16D 15/00* (2006.01)
*F16D 67/02* (2006.01)
*B60N 2/18* (2006.01)

(52) U.S. Cl.
CPC ......... *B60N 2/1615* (2013.01); *B60N 2/1882* (2013.01); *F16D 41/08* (2013.01); *F16D 15/00* (2013.01); *F16D 67/02* (2013.01)

(56) References Cited

U.S. PATENT DOCUMENTS

| | | | | |
|---|---|---|---|---|
| 2004/0099498 A1* | 5/2004 | Kurita | ................... | B60N 2/1615 192/12 B |
| 2009/0272613 A1* | 11/2009 | Kawai | ................... | B60N 2/1615 192/45.01 |
| 2010/0018832 A1* | 1/2010 | Yamada | ............... | B60N 2/1615 192/223.2 |
| 2012/0279819 A1* | 11/2012 | Kawai | ................... | B60N 2/1615 192/55.2 |
| 2015/0001033 A1* | 1/2015 | Kaku | ...................... | F16D 59/00 192/12 B |
| 2015/0096859 A1 | 4/2015 | Isoda et al. | | |

OTHER PUBLICATIONS

International Preliminary Report on Patentability and Written Opinion of the International Searching Authority dated Mar. 5, 2019 in International (PCT) Application No. PCT/JP2017/027602.

* cited by examiner

CLUTCH UNIT

TECHNICAL FIELD

The present invention relates to a clutch unit comprising a lever-side clutch part, which is configured to receive a rotational torque input through a lever operation, and a brake-side clutch part, which is configured to transmit the rotational torque from the lever-side clutch part to an output side and interrupt a rotational torque from the output side.

BACKGROUND ART

In general, in a clutch unit using engaging elements such as cylindrical rollers or balls, a clutch part is arranged between an input member and an output member. The clutch part is configured to engage and disengage the engaging elements, such as cylindrical rollers or balls, between the input member and the output member, to thereby control transmission and interruption of a rotational torque.

The present applicant has previously proposed a clutch unit assembled to a seat lifter part for an automobile, which is configured to vertically adjust a seat through a lever operation (for example, see Patent Literature 1).

The clutch unit disclosed in Patent Literature 1 includes a lever-side clutch part, which is configured to receive a rotational torque input through a lever operation, and a brake-side clutch part, which is configured to transmit the rotational torque input from the lever-side clutch part to an output side and interrupt a rotational torque reversely input from the output side.

The lever-side clutch part mainly includes an outer ring, an inner ring, cylindrical rollers, and a centering spring. The outer ring is configured to receive the rotational torque input through the lever operation. The inner ring is configured to transmit the rotational torque input from the outer ring to the brake-side clutch part. The cylindrical rollers are configured to control the transmission and interruption of the rotational torque from the outer ring through engagement and disengagement in wedge gaps between the outer ring and the inner ring. The centering spring is configured to accumulate an elastic force with the rotational torque input from the outer ring, and return the outer ring to a neutral state by the accumulated elastic force when the input of the rotational torque is lost.

The brake-side clutch part mainly includes an outer ring, an output shaft, cylindrical rollers, plate springs, and a cage. The outer ring is constrained in rotation. The output shaft is configured to output the rotational torque. The cylindrical rollers and the plate springs are configured to control interruption of the rotational torque from the output shaft and transmission of the rotational torque from the lever-side clutch part through engagement and disengagement in wedge gaps between the outer ring and the output shaft. The cage is configured to retain the cylindrical rollers and the plate springs at equal intervals in a circumferential direction. The above-mentioned cage is formed integrally with the inner ring of the lever-side clutch part.

In the lever-side clutch part, when the rotational torque is input to the outer ring through the lever operation, the cylindrical rollers are engaged with the wedge gaps between the outer ring and the inner ring. The rotational torque is transmitted to the inner ring thorough the engagement of the cylindrical rollers in the wedge gaps, thereby rotating the inner ring. On this occasion, as the outer ring rotates, the elastic force is accumulated in the centering spring.

When the input of the rotational torque through the lever operation is lost, the outer ring returns to the neutral state by the elastic force of the centering spring while the inner ring maintains a given rotational position. Thus, the inner ring rotates in an inching manner by repetition of the rotation of the outer ring, that is, a pumping operation on an operation lever.

In the brake-side clutch part, when the rotational torque is reversely input to the output shaft through seating on the seat, the cylindrical rollers are engaged with the wedge gaps between the output shaft and the outer ring, and the output shaft is thus locked to the outer ring. The rotational torque from the output shaft is interrupted through the locking of the output shaft. As a result, a seat surface height of the seat is maintained.

Meanwhile, when the rotational torque is input from the inner ring of the lever-side clutch part to the cage of the brake-side clutch part, the cage rotates to be brought into abutment against the cylindrical rollers, and presses the cylindrical rollers against the elastic forces of the plate springs, thereby disengaging the cylindrical rollers from the wedge gaps between the outer ring and the output shaft. As a result of the disengagement of the cylindrical rollers, the locked state of the output shaft is released, and the output shaft thus becomes rotatable.

Then, the rotational torque from the cage is transmitted to the output shaft through a further rotation of the cage of the brake-side clutch part, thereby rotating the output shaft. In other words, when the cage rotates in the inching manner, the output shaft also rotates in the inching manner. The inching rotation of the output shaft enables the vertical adjustment of the seat.

CITATION LIST

Patent Literature 1: JP 5207779 B2

SUMMARY OF INVENTION

Technical Problem

Incidentally, in the related-art clutch unit disclosed in Patent Literature 1, when the rotational torque is reversely input to the output shaft by the seating on the seat, the cylindrical rollers are engaged with the wedge gaps between the output shaft and the outer ring, and the output shaft is thus locked to the outer ring.

The rotational torque reversely input from the output shaft is locked in the brake-side clutch part through the locking of the output shaft, and the reverse transmission to the lever-side clutch part is interrupted. As a result, the seat surface height of the seat is maintained.

In the clutch unit assembled to the seat lifter part for an automobile, when a vertical vibration is generated during travelling of a vehicle on a rough road or the like in a seating state on the seat, a rotational torque in a forward direction and a rotational torque in a backward direction are reversely input in an alternate and continuous manner to the output shaft.

On this occasion, in the brake-side clutch part, contact positions of the cylindrical rollers in the wedge gaps between the outer ring and the output shaft are slightly displaced, or hysteresis of an elastic deformation is present in the output shaft, the outer ring, the cylindrical rollers, and the plate springs which bear the rotational torque. Thus, the output shaft gradually rotates. As a result, there occurs such a phenomenon in which the seat is slightly lowered.

The present invention has been made in view of the above-mentioned problem, and has an object to provide a clutch unit having a structure capable of reliably locking an output shaft even when rotational torques in forward and backward directions are reversely input in a continuous manner to the output shaft.

Solution to Problem

According to one embodiment of the present invention, there is provided a clutch unit having a basic configuration comprising: a lever-side clutch part, which is provided on an input side, and is configured to control transmission and interruption of a rotational torque input through a lever operation; and a brake-side clutch part, which is provided on an output side, and is configured to transmit the rotational torque from the lever-side clutch part to the output side, and interrupt a rotational torque reversely input from the output side.

It is assumed that the brake-side clutch part in one embodiment of the present invention comprises: a stationary member which is constrained in rotation; an output member configured to output the rotation; an input member, which is arranged between the stationary member and the output member, and is configured to receive the rotational torque input from the lever-side clutch part; and an engaging element configured to control the interruption of the rotational torque reversely input from the output member and the transmission of the rotational torque input from the input member through engagement and disengagement between the stationary member and the output member.

As a technical measure for achieving the above-mentioned object, in the brake-side clutch part, the input member coupled to the output member so as to be capable of transmitting the torque comprises a gear member mounted thereto, which meshes with the stationary member during interruption of the rotational torque and is released from the meshing state with the stationary member during transmission of the rotational torque.

In the present invention, the input member of the brake-side clutch part comprises the gear member mounted thereto. With this configuration, even when a rotational torque in a forward direction and a rotational torque in a backward direction are reversely input in an alternate and continuous manner to the output member while the output member is locked, the gear member mounted to the input member meshes with the stationary member, thereby being capable of reliably locking the output member coupled to the input member so as to be capable of transmitting the torque.

In the brake-side clutch part, even when a contact position of the engaging element is slightly displaced between the stationary member and the output member, or hysteresis of elastic deformation is present in the output member, the stationary member, and the engaging element which bear the rotational torque, the gradual rotation of the output member can be prevented through the meshing between the gear member and the stationary member.

According to one embodiment of the present invention, it is desired that the gear member be arranged so as to be movable in an axial direction relative to the input member of the brake-side clutch part, and that a cam mechanism configured to move the gear member in the axial direction to control the meshing with the stationary member and the release of the meshing state be interposed between the gear member and the input member of the lever-side clutch part.

When such a structure is employed, the gear member can be moved in the axial direction by the cam mechanism, and the meshing and the release of the meshing state between the gear member and the stationary member can thus easily be performed through the movement of the gear member in the axial direction.

In the present invention, it is desired that an elastic member configured to elastically urge the gear member in a direction of releasing the meshing state between the gear member and the stationary member be interposed between the input member of the brake-side clutch part and the gear member.

When such a structure is employed, the elastic force of the elastic member can be applied to the input member and the gear member. Thus, the meshing state between the gear member and the stationary member can thus reliably be released when the locked state of the output member is released.

In the clutch unit according to one embodiment of the present invention, the lever-side clutch part and the brake-side clutch part are assembled to a seat lifter part for an automobile. With such a structure, the clutch unit is suitable for use in an automobile.

Advantageous Effects of Invention

According to the present invention, the input member of the brake-side clutch part comprises the gear member mounted thereto. Thus, with this configuration, even when the rotational torque in the forward direction and the rotational torque in the backward direction are reversely input in the alternate and continuous manner to the output member while the output member is locked, the gear member mounted to the input member meshes with the stationary member, thereby being capable of reliably locking the output member coupled to the input member so as to be capable of transmitting the torque.

In the brake-side clutch part, even when the contact position of the engaging element is slightly displaced between the stationary member and the output member, or hysteresis of elastic deformation is present in the output member, the stationary member, and the engaging element which bear the rotational torque, the gradual rotation of the output member can be prevented through the meshing between the gear member and the stationary member.

As a result, in a case in which the brake-side clutch part is assembled to the seat lifter part for an automobile, even when a vertical vibration is generated during travelling of a vehicle on a rough road or the like in a seating state on the seat, occurrence of the phenomenon in which the seat is slightly lowered can be prevented.

DESCRIPTION OF EMBODIMENTS

Figure 1:
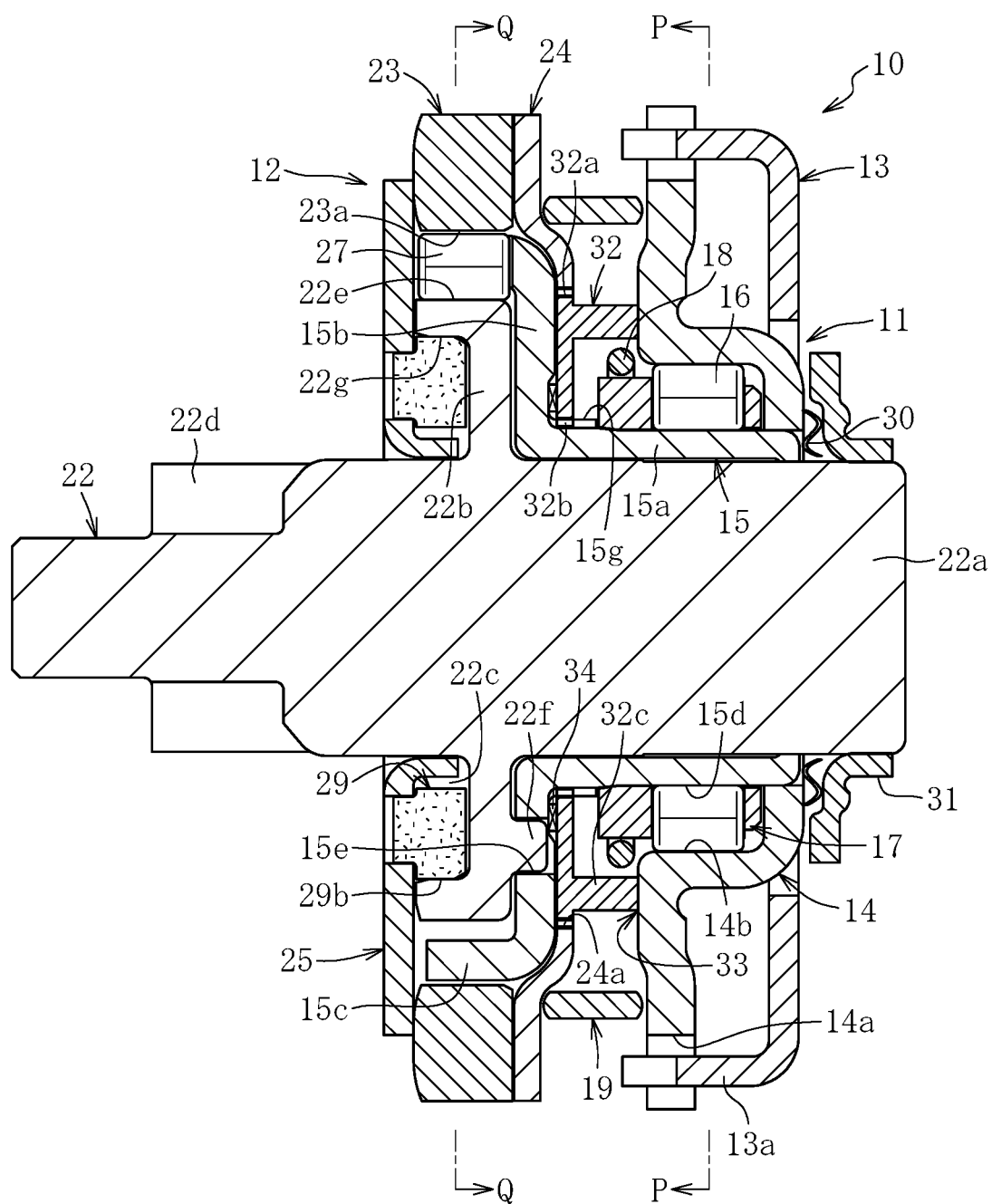
FIG. 1 is a sectional view for illustrating an overall configuration of a clutch unit according to an embodiment of the present invention.
Figure 2:
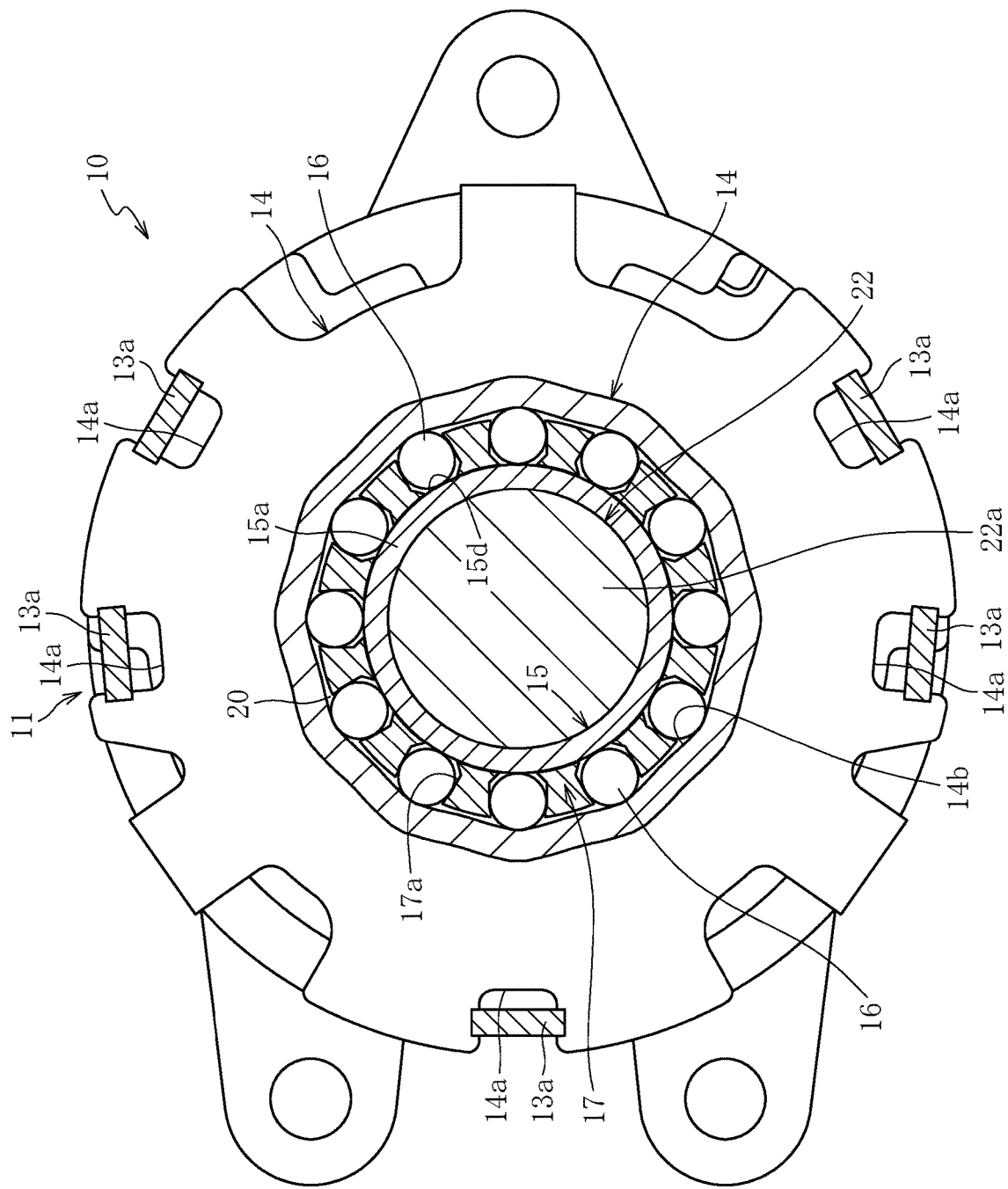
FIG. 2 is a sectional view taken along the line P-P in FIG. 1.
Figure 3:
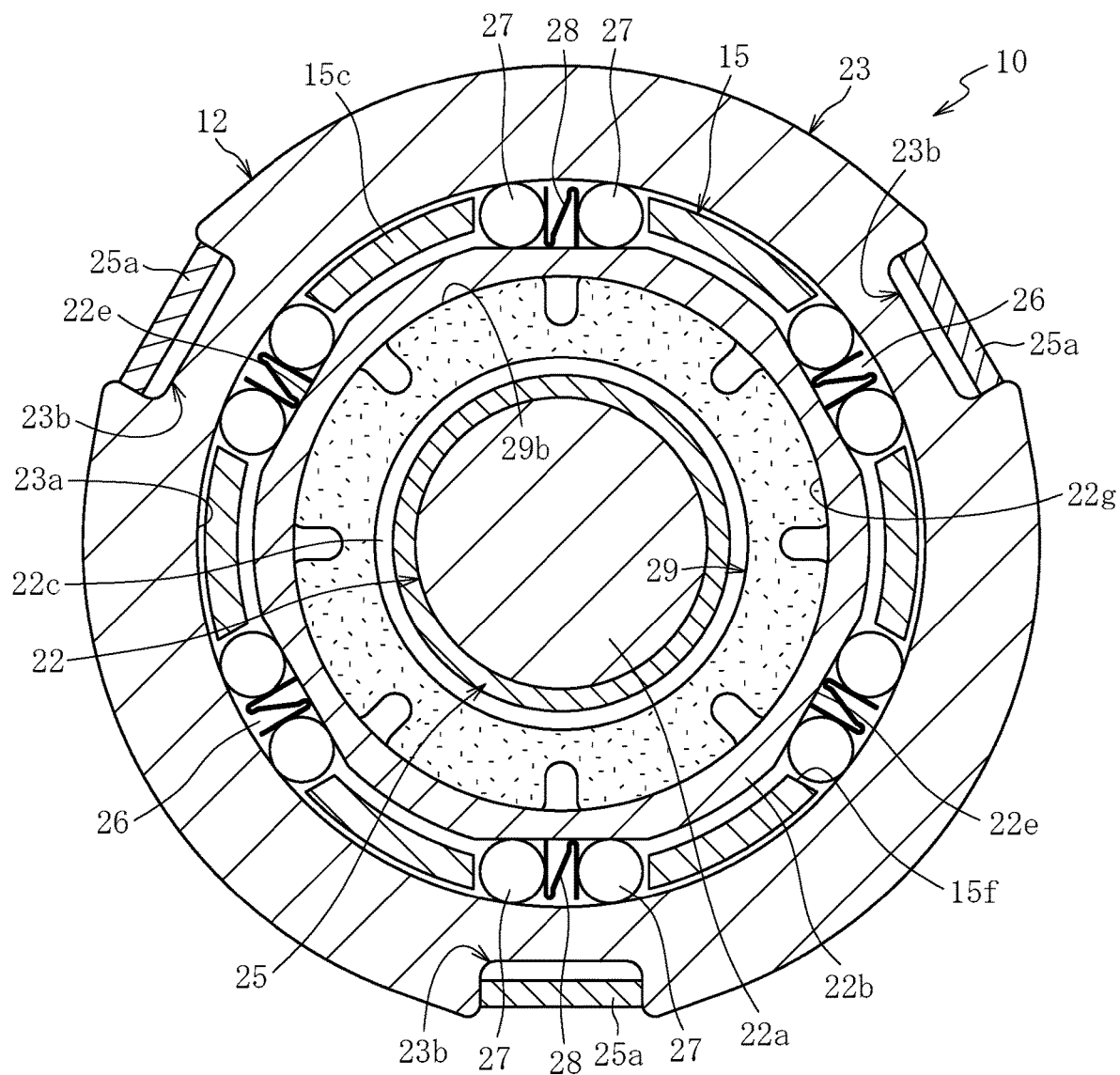
FIG. 3 is a sectional view taken along the line Q-Q in FIG. 1.

Detailed description is now given of a clutch unit according to an embodiment of the present invention with reference to the drawings. FIG. 1 is a sectional view for illustrating an overall configuration of the clutch unit according to this embodiment. FIG. 2 is a sectional view taken along the line P-P in FIG. 1. FIG. 3 is a sectional view taken along the line Q-Q in FIG. 1. Before description of a characteristic configuration of this embodiment, description is now given of the overall configuration of the clutch unit.

As illustrated in FIG. 1, the clutch unit 10 according to this embodiment has a unit structure integrally comprising a lever-side clutch part 11 and a brake-side clutch part 12. The lever-side clutch part 11 is provided on an input side, and the brake-side clutch part 12 is provided on an output side. The lever-side clutch part 11 is configured to control transmission and interruption of a rotational torque input through a lever operation. The brake-side clutch part 12 has a reverse input interrupting function of transmitting the rotational torque input from the lever-side clutch part 11 to the output side and interrupting the rotational torque reversely input from the output side.

As illustrated in FIG. 1 and FIG. 2, the lever-side clutch part 11 mainly comprises aside plate 13, an outer ring 14, an inner ring 15, a plurality of cylindrical rollers 16, a cage 17, an inner centering spring 18, and an outer centering spring 19. The side plate 13 and the outer ring 14 are configured to receive the rotational torque input through the lever operation. The inner ring 15 is configured to transmit the rotational torque input from the outer ring 14 to the brake-side clutch part 12. The plurality of cylindrical rollers 16 are configured to control transmission and interruption of the rotational torque from the outer ring 14 through the engagement and disengagement between the outer ring 14 and the inner ring 15. The cage 17 is configured to retain the cylindrical rollers 16 at equal intervals in a circumferential direction. The inner centering spring 18 is configured to return the cage 17 to a neutral state. The outer centering spring 19 is configured to return the outer ring 14 to a neutral state.

In the lever-side clutch part 11, the side plate 13 is fixed to the outer ring 14 by inserting claw parts 13a formed on an outer peripheral edge portion of the side plate 13 into cutout recessed parts 14a formed in an outer peripheral edge portion of the outer ring 14, and crimping the claw parts 13a. Thus, the side plate 13 and the outer ring 14 are formed into an integrated input member of the lever-side clutch part 11. A plurality of cam surfaces 14b are formed at equal intervals in the circumferential direction on an inner periphery of the outer ring 14. The input of the rotational torque to the outer ring 14 is performed through an operation lever 43 (see FIG. 4), which is mounted to the side plate 13 by screwing or the like and is swingable in a vertical direction.

The inner ring 15 comprises a tubular part 15a, a radially expanded part 15b, and a plurality of pillar parts 15c. The tubular part 15a is configured to receive an output shaft 22 inserted therethrough. The radially expanded part 15b is formed by extending an end portion of the tubular part 15a on a brake side radially outward. The plurality of pillar parts 15c are formed so as to protrude by bending an outer peripheral end portion of the radially expanded part 15b in an axial direction. A wedge gap 20 is formed between a cylindrical outer peripheral surface 15d of the tubular part 15a of the inner ring 15 and each of the cam surfaces 14b formed on the inner periphery of the outer ring 14. The cylindrical rollers 16 are arranged in the wedge gaps 20 at the equal intervals in the circumferential direction by the cage 17.

The inner centering spring 18 is a C-shaped elastic member having a circular cross section provided between the cage 17 and a cover 24 of the brake-side clutch part 12. Both end portions of the inner centering spring 18 are locked to parts of the cage 17 and the cover 24. When the rotational torque input from the outer ring 14 through the lever operation is applied, the inner centering spring 18 is spread outward as the cage 17 following the outer ring 14 rotates relative to the cover 24 in a stationary state, and an elastic force is thus accumulated. When the rotational torque input from the outer ring 14 is released, the inner centering spring 18 returns the cage 17 to the neutral state by the elastic force.

The outer centering spring 19 positioned on a radially outer side with respect to the inner centering spring 18 is a C-shaped band-plate elastic member arranged between the outer ring 14 and the cover 24. Both end portions of the outer centering spring 19 are locked to parts of the outer ring 14 and the cover 24. When the rotational torque input from the outer ring 14 through the lever operation is applied, the outer centering spring 19 is spread outward as the outer ring 14 rotates relative to the cover 24 in a stationary state, and an elastic force is thus accumulated. When the rotational torque input from the outer ring 14 is released, the outer centering spring 19 returns the outer ring 14 to the neutral state by the elastic force.

The cage 17 is a cylindrical member made of resin in which a plurality of pockets 17a configured to receive the cylindrical rollers 16 are formed at the equal intervals in the circumferential direction. The end portion of the inner centering spring 18 are locked to one end portion of the cage 17 in the axial direction, that is, an end portion of the brake-side clutch part 12 on the cover 24 side in the axial direction. The cage 17 is arranged between the outer ring 14 and the inner ring 15.

As illustrated in FIG. 1 and FIG. 3, the brake-side clutch part 12, which is of a type called "lock type" and has the reverse input interrupting function, mainly comprises the inner ring 15, the output shaft 22, an outer ring 23, the cover 24, a side plate 25, a plurality of pairs of cylindrical rollers 27, plate springs 28, and a friction ring 29. The inner ring 15 serves as an input member configured to receive the rotational torque input from the lever-side clutch part 11. The output shaft 22 serves as an output member configured to output the rotational torque from the lever-side clutch part 11. The outer ring 23, the cover 24, and the side plate 25 serve as a stationary member which is constrained in rotation. The plurality of pairs of cylindrical rollers 27 serve as engaging elements configured to control interruption of the rotational torque reversely input from the output shaft 22 and transmission of the rotational torque input from the inner ring 15 through engagement and disengagement between the outer ring 23 and the output shaft 22. The plate springs 28 each have an N-shaped cross section, and are configured to apply a separating force in the circumferential direction to the pairs of cylindrical rollers 27. The friction ring 29 is configured to apply a rotational resistance to the output shaft 22.

In the output shaft 22, a large-diameter part 22b extending outward in the radial direction so as to have a larger diameter is formed integrally with a center portion of a shaft part 22a in the axial direction on which the tubular part 15a of the inner ring 15 is externally inserted. A pinion gear 22d configured to be coupled to a seat lifter part 41 (see FIG. 4) is coaxially formed at an end portion of the shaft part 22a on an output side. Moreover, a washer 31 is press-fitted to an end portion of the shaft part 22a on an input side through intermediation of a wave washer 30, thereby preventing removal of the components of the lever-side clutch part 11.

A plurality of flat cam surfaces 22e are formed at equal intervals in the circumferential direction on an outer periphery of the large-diameter part 22b of the output shaft 22. The two cylindrical rollers 27 and the one plate spring 28 interposed between the two cylindrical rollers 27 are arranged in each of wedge gaps 26 formed between each of the cam surfaces 22e of the larger diameter part 22b and a cylindrical inner peripheral surface 23a of the outer ring 23. The cylindrical rollers 27 and the plate spring 28 are arranged at the equal intervals in the circumferential direction by the pillar parts 15c of the inner ring 15.

The inner ring 15 has a function as an input member of the brake-side clutch part 12 by transmitting the rotational torque input from the outer ring 14 of the lever-side clutch part 11 to the output shaft 22 through the radially expanded part 15b. Moreover, the inner ring 15 has a function as a cage by receiving the cylindrical rollers 27 and the plate springs 28 in pockets 15f and retaining the cylindrical rollers 27 and the plate springs 28 by the pillar parts 15c at the equal intervals in the circumferential direction.

A protrusion 22f configured to transmit the rotational torque from the inner ring 15 to the output shaft 22 is formed on the large-diameter part 22b of the output shaft 22. The protrusion 22f is inserted and arranged with a clearance in the circumferential direction in a hole 15e formed in the radially expanded part 15b of the inner ring 15 (see FIG. 1). In such a manner, the output shaft 22 and the inner ring 15 are coupled to each other so as to be capable of transmitting the torque through the protrusion 22f and the hole 15e.

In the brake-side clutch part 12, the side plate 25 is fixed to the outer ring 23 and the cover 24 by inserting claw parts 25a formed on an outer peripheral edge portion of the side plate 25 into cutout recessed parts 23b formed in an outer peripheral edge portion of the outer ring 23 having a thick plate shape and cutout recessed parts (not shown) formed in an outer peripheral edge portion of the cover 24, and crimping the claw parts 25a. As a result, the outer ring 23, the cover 24, and the side plate 25 are integrated as a stationary member of the brake-side clutch part 12.

The friction ring 29 is a member formed into a ring shape by applying injection-molding or the like on a resin material, and is fixed to the side plate 25. This friction ring 29 is press-fitted with interference to an inner peripheral surface 22g of an annular recessed part 22c formed in the large-diameter part 22b of the output shaft 22. A rotational resistance is applied to the output shaft 22 by a friction force generated between an outer peripheral surface 29b of the friction ring 29 and the inner peripheral surface 22g of the annular recessed part 22c of the output shaft 22 when the lever is operated.

Description is now given of an operation example of the lever-side clutch part 11 and the brake-side clutch part 12 having the configuration described above.

In the lever-side clutch part 11, when the rotational torque is input to the outer ring 14 through the lever operation, the cylindrical rollers 16 are engaged with the wedge gaps 20 between the cam surfaces 14b of the outer ring 14 and the cylindrical outer peripheral surface 15d of the inner ring 15. The rotational torque is transmitted to the inner ring 15 thorough the engagement of the cylindrical rollers 16 in the wedge gaps 20, thereby rotating the inner ring 15. On this occasion, as the outer ring 14 and the cage 17 rotate, the elastic forces are accumulated in both of the centering springs 18 and 19.

When the input of the rotational torque through the lever operation is lost, the cage 17 and the outer ring 14 return to the respective neutral states by the elastic forces of both of the centering springs 18 and 19. Meanwhile, the inner ring 15 maintains a given rotational position. Thus, the inner ring 15 rotates in an inching manner by repetition of the rotation of the outer ring 14, that is, a pumping operation on the operation lever 43.

In the brake-side clutch part 12, even when a rotational torque is reversely input to the output shaft 22 by seating on a seat 40 (see FIG. 4), the cylindrical rollers 27 are engaged with the wedge gaps 26 between the cam surfaces 22e of the output shaft 22 and the cylindrical inner peripheral surface 23a of the outer ring 23, and the output shaft 22 is thus locked to the outer ring 23. In such a manner, the rotational torque reversely input from the output shaft 22 is locked by the brake-side clutch part 12, and reverse transmission to the lever-side clutch part 11 is interrupted. As a result, a seat surface height of the seat 40 is maintained.

Meanwhile, when the rotational torque is input from the inner ring 15 of the lever-side clutch part 11 to the pillar parts 15c through the lever operation, the pillar parts 15c are brought into abutment against the cylindrical rollers 27, and press the cylindrical rollers 27 against the elastic forces of the plate springs 28. With this, the cylindrical rollers 27 are disengaged from the wedge gaps 26. As a result of the disengagement of the cylindrical rollers 27 from the wedge gaps 26, the locked state of the output shaft 22 is released, and the output shaft 22 thus becomes rotatable. When the locked state of the output shaft 22 is released, the rotational resistance is applied to the output shaft 22 by the friction ring 29.

When the pillar parts 15c of the inner ring 15 further rotate, the clearance between the hole 15e of the radially expanded part 15b of the inner ring 15 and the protrusion 22f of the large-diameter part 22b of the output shaft 22 decreases, and the radially expanded part 15b of the inner ring 15 is brought into abutment against the protrusion 22f of the output shaft 22 in the rotational direction. As a result, the rotational torque from the lever-side clutch part 11 is transmitted to the output shaft 22 via the protrusion 22f, and the output shaft 22 thus rotates. In other words, when the pillar parts 15c rotate in the inching manner, the output shaft 22 also rotates in the inching manner. As a result, the seat 40 can be vertically adjusted.

Figure 4:
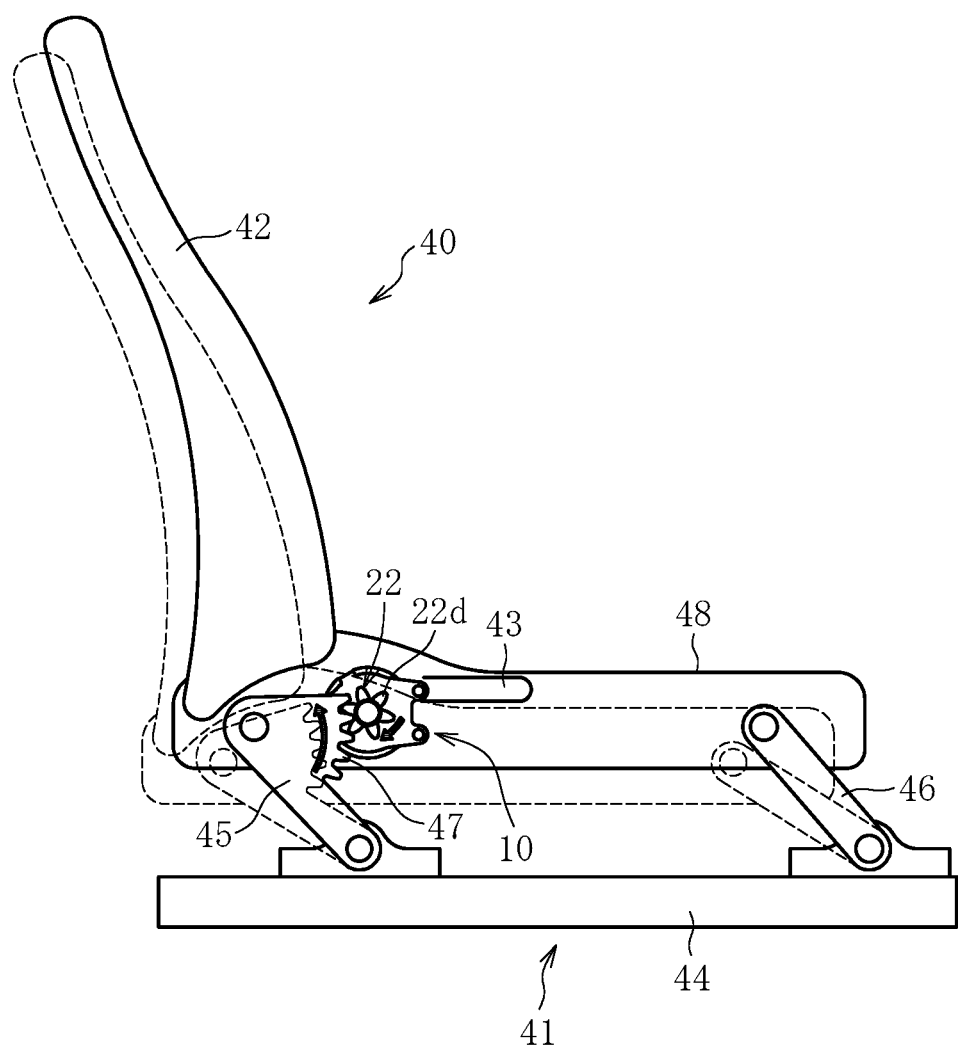
FIG. 4 is a configuration view for illustrating a seat for an automobile and a seat lifter part.

The clutch unit 10 having the structure described above is used after being assembled to the seat lifter part 41 for an automobile, which is configured to adjust a height of the seat 40 through the lever operation. FIG. 4 is a view for illustrating the seat 40 installed in a cabin of an automobile.

As illustrated in FIG. 4, the seat 40 comprises a seating seat 48 and a backrest seat 42, and a height of a seat surface of the seating seat 48 is adjusted by the seat lifter part 41. The height adjustment of the seating seat 48 is performed through the operation lever 43 mounted to the side plate 13 of the lever-side clutch part 11 (see FIG. 1) in the clutch unit 10.

The seat lifter part 41 has the following structure. One ends of link members 45 and 46 are pivotably mounted to a slidable member 44. Another ends of the link members 45 and 46 are pivotably mounted to the seating seat 48. A sector gear 47 is provided integrally with another end of the link member 45. The sector gear 47 meshes with the pinion gear 22*d* of the output shaft 22 of the clutch unit 10.

For example, when the seat surface of the seating seat 48 is to be lowered, the locked state of the brake-side clutch part (see FIG. 1) is released through the lever operation in the lever-side clutch part 11, in other words, by swinging the operation lever 43 downward. When the brake-side clutch part 12 is unlocked, the seat surface of the seating seat 48 can smoothly be lowered by applying the appropriate rotational resistance to the output shaft 22 through the friction ring 29 (see FIG. 1).

As a result of the unlocking of the brake-side clutch part 12, the pinion gear 22*d* of the output shaft 22 of the brake-side clutch part 12 is turned clockwise (in a direction indicated by the arrow of FIG. 4) by a rotational torque transmitted from the lever-side clutch part 11 to the brake-side clutch part 12. Then, the sector gear 47 meshing with the pinion gear 22*d* swings counterclockwise (in a direction indicated by the arrow of FIG. 4). As a result, both of the link member 45 and the link member 46 tilt so that the seat surface of the seating seat 48 is lowered.

In such a manner, when the operation lever 43 is released after the height of the seat surface of the seating seat 48 is adjusted, the operation lever 43 swings upward by the elastic forces of both of the centering springs 18 and 19, and returns to an original position (neutral state). When the operation lever 43 is swung upward, the seat surface of the seating seat 48 is raised through an operation opposite to the operation described above. When the operation lever 43 is released after the height adjustment of the seating seat 48, the operation lever 43 swings downward, and returns to the original position (neutral state).

The overall configuration of the clutch unit 10 according to the embodiment and the seat lifter part 41 into which the clutch unit 10 is assembled are as described above. Detailed description is now given of the characteristic configuration of the clutch unit 10.

While the output shaft 22 is locked in the brake-side clutch part 12, when a vertical vibration is generated during travelling of a vehicle on a rough road or the like in a seating state on the seat 40 (see FIG. 4), a rotational torque in a forward direction and a rotational torque in a backward direction are reversely input in an alternate and continuous manner to the output shaft 22. In order to reliably lock the output shaft 22 even when the rotational torques in the forward and backward directions are reversely input in a continuous manner to the output shaft 22, the following structure is provided.

Figure 5:
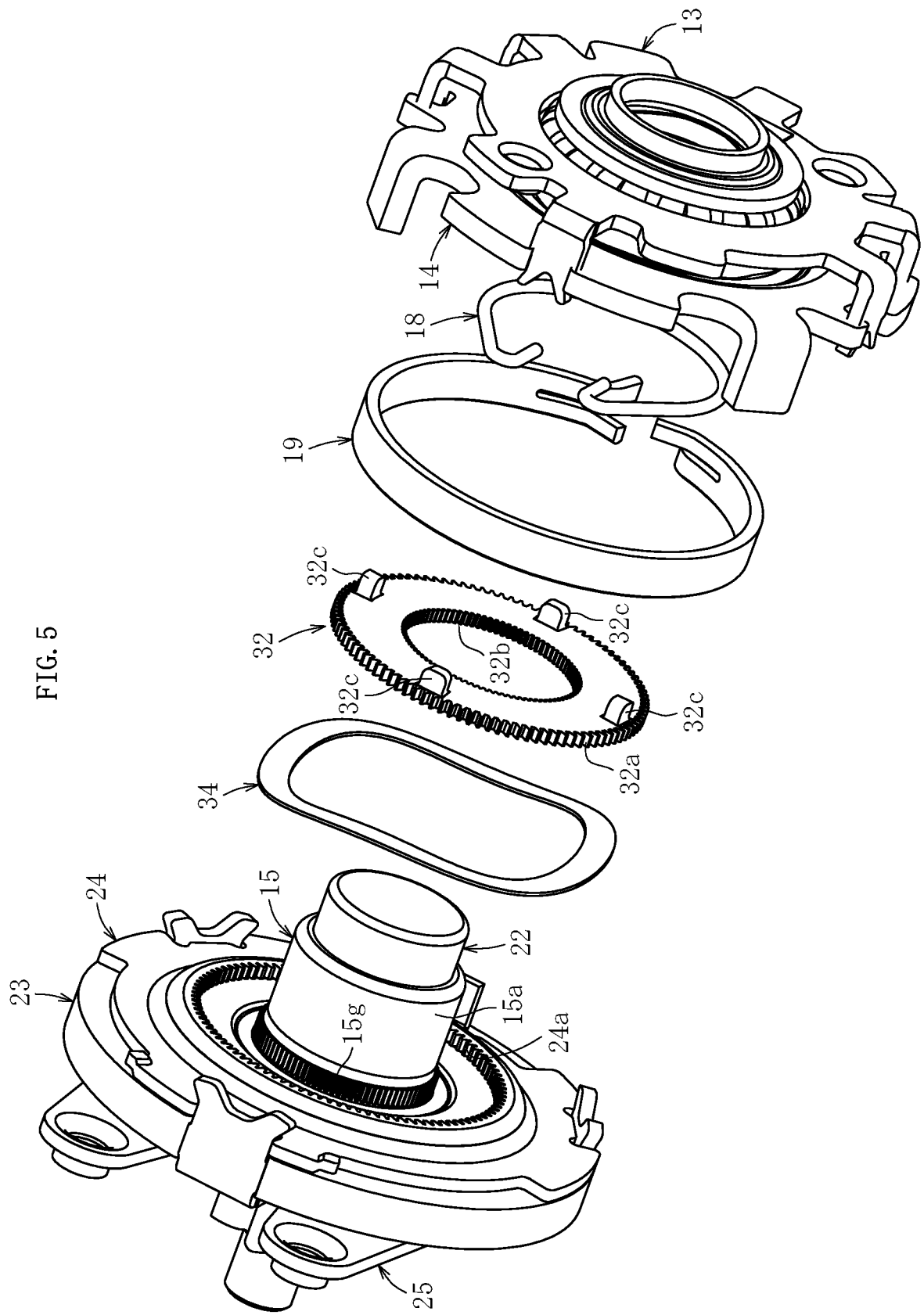
FIG. 5 is an assembly exploded perspective view for illustrating components including an input member, a gear member, an elastic member, and a stationary member in the clutch unit of FIG. 1 as viewed from an input side.
Figure 6:
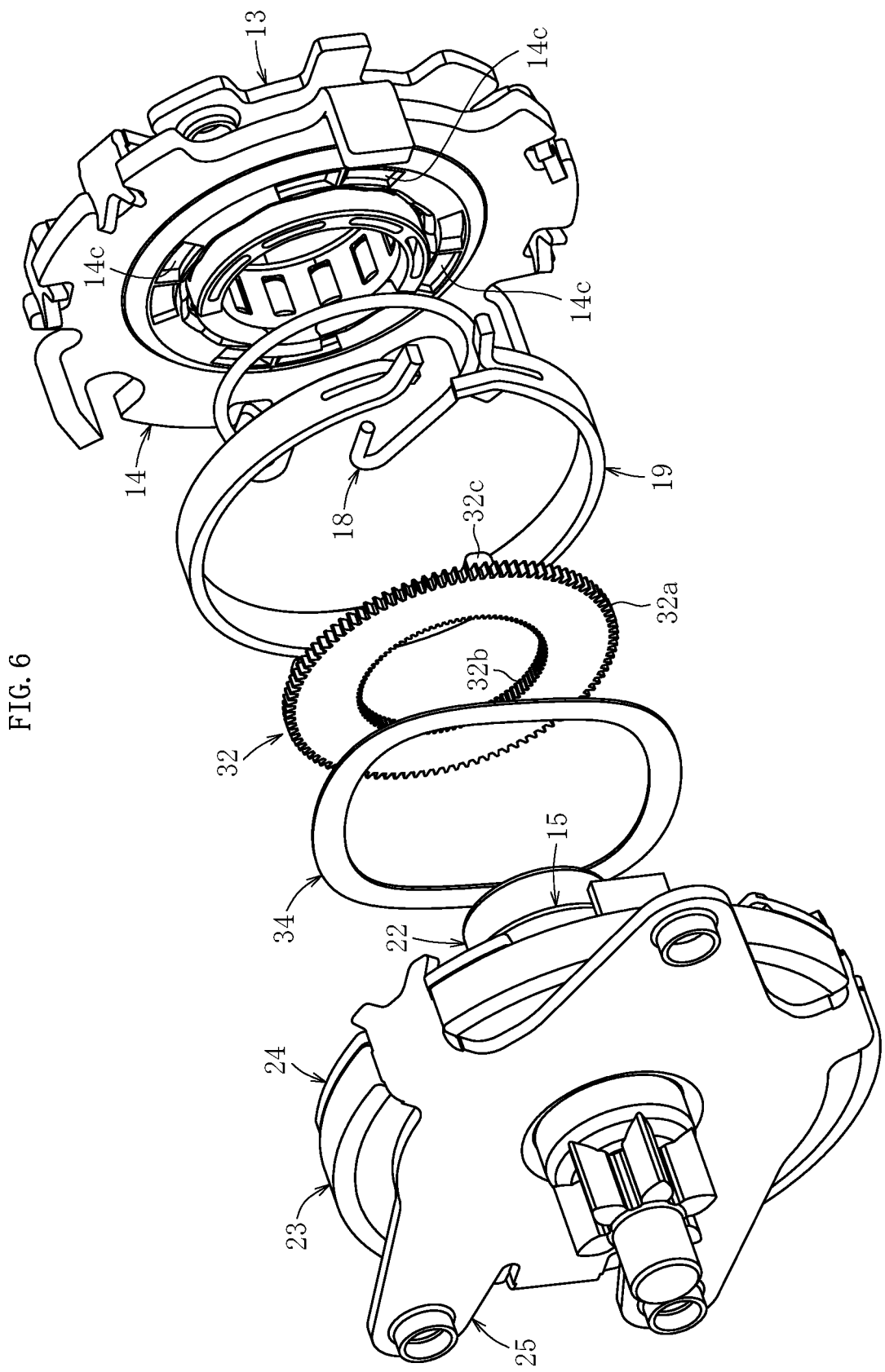
FIG. 6 is an assembly exploded perspective view for illustrating the components including the input member, the gear member, the elastic member, and the stationary member in the clutch unit of FIG. 1 as viewed from an output side.

As illustrated in FIG. 1, FIG. 5, and FIG. 6, the brake-side clutch part 12 in this embodiment has such a structure that the inner ring 15 comprises a slide gear 32 being a gear member mounted thereto, which meshes with the cover 24 during interruption of the rotational torque and is released from the meshing state with the cover 24 during transmission of the rotational torque. The slide gear 32 is arranged so as to be movable in the axial direction relative to the inner ring 15 under a state in which the slide gear 32 is arranged on a radially inner side with respect to the cover 24.

The slide gear 32 is a ring-shaped band-plate member having teeth 32*a* (hereinafter referred to as "external teeth") formed on an outer periphery thereof. In contrast, teeth 24*a* (hereinafter referred to as "internal teeth") corresponding to the external teeth 32*a* of the slide gear 32, respectively, are formed on an inner periphery of the cover 24. The external teeth 32*a* of the side gear 32 and the internal teeth 24*a* of the cover 24 can mesh with each other.

Splines 32*b* and 15*g* are formed on an inner periphery of the slide gear 32 and an outer periphery of the tubular part 15*a* of the inner ring 15, respectively. A movement of the slide gear 32 in the axial direction relative to the inner ring 15 is permitted, and a movement of the slide gear 32 in the circumferential direction (rotation) relative to the inner ring 15 is inhibited through the splines 32*b* and 15*g*. In this embodiment, as the meshing structure between the slide gear 32 and the inner ring 15, the spline structure movable in the axial direction is exemplified. However, the meshing structure may be a key structure capable of moving in the axial direction, and preventing the rotation.

Meanwhile, a cam mechanism 33 configured to move the slide gear 32 in the axial direction to control meshing and release of the meshing state with the cover 24 is interposed between the slide gear 32 and the outer ring 14 of the lever-side clutch part 11.

Figure 7:
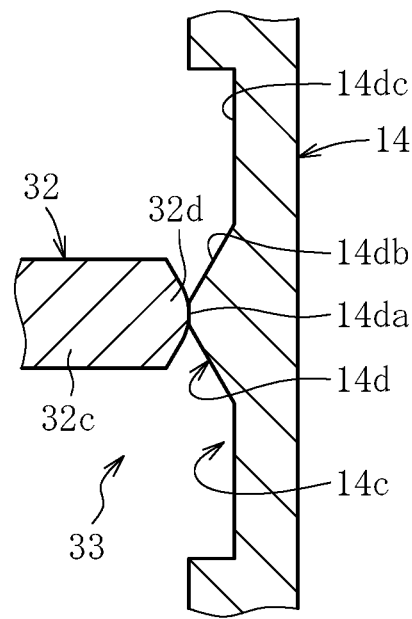
FIG. 7 is a partial enlarged sectional view for illustrating a cam mechanism in a neutral state in the clutch unit of FIG. 1.
Figure 8:
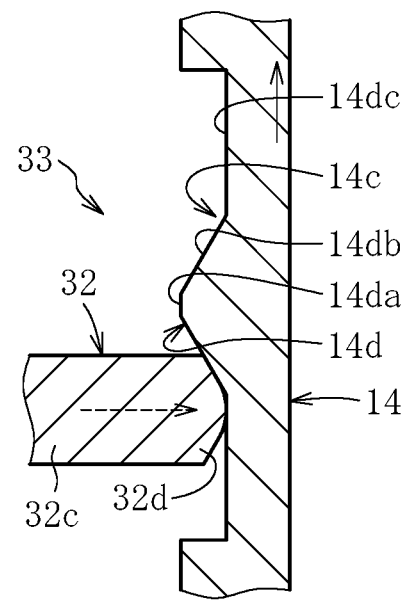
FIG. 8 is a partial enlarged sectional view for illustrating the cam mechanism in an operation state in the clutch unit of FIG. 1.

As illustrated in FIG. 7 and FIG. 8, this cam mechanism 33 comprises protrusions 32*c* (see FIG. 1 and FIG. 5) and cam grooves 14*c* (see FIG. 6). The protrusions 32*c* are formed so as to extend in the axial direction on an end surface of the slide gear 32 opposed to the outer ring 14. The cam grooves 14*c* are formed along the circumferential direction at portions of the outer ring 14 of the lever-side clutch part 11 opposed to the slide gear 32.

As illustrated in FIG. 5 and FIG. 6, the protrusions 32*c* are formed at equal intervals at a plurality of positions (four positions) in the circumferential direction on the end surface of the slide gear 32. Moreover, the cam grooves 14*c* are formed at equal intervals at a plurality of positions (four positions) of the outer ring 14 in the circumferential direction so as to correspond to the protrusions 32*c* of the slide gear 32. In this embodiment, the four protrusions 32*c* and the four cam grooves 14*c* are exemplified, but the number is freely selected.

As illustrated in FIG. 7 and FIG. 8, a distal-end curve forming part 32*d* of each of the protrusions 32*c* of the slide gear 32 is brought into abutment against a cam surface 14*d* of each of the cam grooves 14*c* of the outer ring 14 in the cam mechanism 33. The cam surface 14*d* comprises a crest portion 14*da*, inclined portions 14*db*, and groove bottom portions 14*dc*. The crest portion 14*da* is positioned at the center in the cam groove 14*c*. The inclined portions 14*db* extend from the crest portion 14*da* toward both sides in the circumferential direction. The groove bottom portions 14*dc* extend from the inclined portions 14*db* toward the both sides in the circumferential direction.

Moreover, as illustrated in FIG. 1, FIG. 5, and FIG. 6, an elastic member 34 configured to elastically urge the slide gear 32 in a direction of releasing the meshing state between the slide gear 32 and the cover 24 is interposed between a root portion of the radially expanded part 15*b* of the inner ring 15 and the slide gear 32. As this elastic member 34, for example, a wave spring having a ring shape is preferred (see FIG. 5 and FIG. 6).

The elastic member 34 is configured to apply its elastic force to the slide gear 32, to thereby press the slide gear 32 toward the outer ring 14 side relative to the cover 24 in the stationary state. As a result, the external teeth 32*a* of the slide gear 32 are reliably disengaged from the internal teeth 24a of the cover 24 when the locked state of the output shaft 22 is released.

In the clutch unit 10 according to this embodiment, the outer ring 14 is maintained in the neutral state by the outer centering spring 19 under the state in which the rotational torque is not input from the outer ring 14 of the lever-side clutch part 11.

On this occasion, as illustrated in FIG. 7, in the cam mechanism 33 of the brake-side clutch part 12, the distal-end curve forming part 32d of each of the protrusions 32c of the slide gear 32 is at a neutral position at which the distal-end curve forming part 32d is held in abutment against the crest portion 14da of the cam surface 14d of each of the cam grooves 14c of the outer ring 14 of the lever-side clutch part 11.

Under the state in which the protrusions 32c of the slide gear 32 are at the neutral positions of the cam grooves 14, the slide gear 32 is pressed toward the cover 24 side in the axial direction against the elastic force of the elastic member 34, and the external teeth 32a of the slide gear 32 and the internal teeth 24a of the cover 24 mesh with each other (see FIG. 1).

On this occasion, the inner ring 15 is coupled to the slide gear 32 through the splines 15g and 32b, and cannot thus move (rotate) in the circumferential direction so as to remain in the stationary state. Moreover, the inner ring 15 and the output shaft 22 are coupled to each other so as to be capable of transmitting the torque through the hole 15e of the radially expanded part 15b and the protrusion 22f of the large-diameter part 22b (see FIG. 1).

In such a manner, the external teeth 32a of the slide gear 32 mesh with the internal teeth 24a of the cover 24, and the inner ring 15 is prevented by the splines 32b and 15g from rotating relative to the slide gear 32. The inner ring 15 is consequently coupled to the output shaft 22 so as to be capable of transmitting the torque.

As a result, even when a vertical vibration is generated during travelling of a vehicle on a rough road or the like in a seating state on the seat 40, and a rotational torque in a forward direction and a rotational torque in a backward direction are reversely input in an alternate and continuous manner to the output shaft 22 due to the vertical vibration, the rotation of the output shaft 22 can be stopped at a time point when the protrusion 22f of the output shaft 22 rotates by an angle corresponding to a clearance at which the protrusion 22f of the output shaft 22 comes into contact with the hole 15e of the inner ring 15. In other words, the output shaft 22 does not rotate beyond an amount equal to or more than the minute angle corresponding to the clearance between the hole 15e of the inner ring 15 and the protrusion 22f of the output shaft 22, and the output shaft 22 can thus be locked.

In the brake-side clutch part 12, even when contact positions of the cylindrical rollers 27 are slightly displaced between the outer ring 23 and the output shaft 22, or hysteresis of an elastic deformation is present in the output shaft 22, the outer ring 23, and the cylindrical rollers 27 which bear the rotational torque, a gradual rotation of the output shaft 22 can thus be prevented through the meshing between the external teeth 32a of the slide gear 32 and the internal teeth 24a of the cover 24.

As a result, occurrence of a phenomenon in which the seat 40 is slightly lowered can be prevented. Moreover, the meshing between the external teeth 32a of the slide gear 32 and the internal teeth 24a of the cover 24 enables bearing of a high torque on the brake-side clutch part 12.

Meanwhile, when the rotational torque is input from the outer ring 14 of the lever-side clutch part 11, a phase shift occurs between the protrusions 32c of the slide gear 32 and the cam grooves 14c of the outer ring 14 in the cam mechanism 33 of the brake-side clutch part 12.

Specifically, when the cam surface 14d of each of the cam grooves 14c of the outer ring 14 moves in the circumferential direction relative to the distal-end curve forming part 32d of each of the protrusions 32c of the slide gear 32 as a result of the rotation of the outer ring 14 as indicated by the solid arrow of FIG. 8, each of the protrusions 32b of the slide gear 32 moves in the axial direction in a direction of approaching the outer ring 14 by the elastic force of the elastic member 34 as indicated by the broken arrow of FIG. 8.

As a result of the movement of the cam grooves 14c of the outer ring 14 in the circumferential direction and the movement of the protrusions 32c of the slide gear 32 in the axial direction, the distal-end curve forming part 32d of each of the protrusions 32c of the slide gear 32 moves from the crest portion 14da of the cam surface 14d to the groove bottom portion 14dc through the inclined portion 14db. As a result, the distal-end curve forming parts 32d of the protrusions 32c of the slide gear 32 are held in abutment against the groove bottom portions 14dc of the cam surfaces 14d of the cam grooves 14c.

Figure 9:
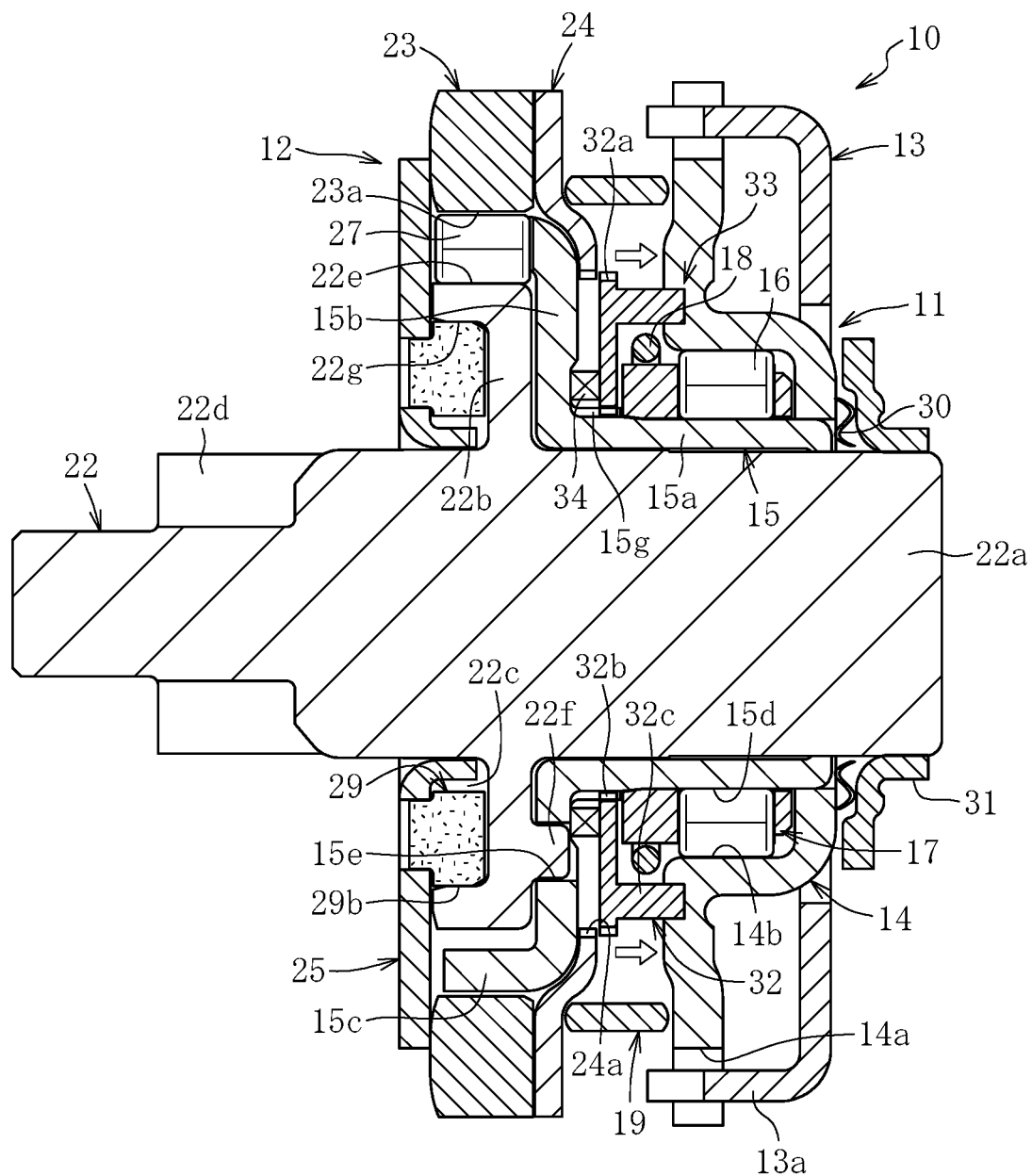
FIG. 9 is a sectional view for illustrating an operation state of the clutch unit of FIG. 1.

As described above, as illustrated in FIG. 9, the slide gear 32 moves in the axial direction (see the outlined arrows of FIG. 9) so as to be disengaged from the cover 24 by the elastic force of the elastic member 34 as a result of the phase shift between each of the protrusions 32c of the slide gear 32 and each of the cam grooves 14c of the outer ring 14.

As a result of the movement of the slide gear 32 in the axial direction, the external teeth 32a of the slide gear 32 are disengaged from the internal teeth 24a of the cover 24, and the meshing state between the external teeth 32a of the slide gear 32 and the internal teeth 24a of the cover 24 is thus released. As a result, the locked state of the output shaft 22 is released, and the output shaft 22 thus becomes rotatable relative to the outer ring 23.

In this embodiment, there is employed a structure in which the elastic member 34 configured to elastically urge the slide gear 32 in the direction of releasing the meshing state between the slide gear 32 and the cover 24 is interposed between the radially expanded part 15b of the inner ring 15 and the slide gear 32. With this structure, the external teeth 32a of the slide gear 32 can reliably be disengaged from the internal teeth 24a of the cover 24 by the elastic force of the elastic member 34 when the locked state of the output shaft 22 is released.

Moreover, in this embodiment, there is employed a structure in which the cam mechanism 33 (the protrusions 32c of the slide gear 32 and the cam grooves 14c of the outer ring 14) configured to move the slide gear 32 in the axial direction to control the meshing and the release of the meshing state with the cover 24 is interposed between the slide gear 32 and the outer ring 14. Thus, the meshing and the release of the meshing state between the slide gear 32 and the cover 24 can thus easily be performed.

Moreover, immediately after the external teeth 32a of the slide gear 32 are disengaged from the internal teeth 24a of the cover 24, there is given the state in which the cylindrical rollers 27 are engaged with the wedge gaps 26 between the outer ring 23 and the output shaft 22 in the brake-side clutch part 12. Therefore, even when the rotational torque is reversely input to the output shaft 22 at this time point, the output shaft 22 is reliably locked.

After that, when the external teeth 32a of the slide gear 32 are completely disengaged from the internal teeth 24a of the cover 24 as a result of the movement of the slide gear 32 in the axial direction, the cylindrical rollers 27 are disengaged from the wedge gaps 26 between the outer ring 23 and the output shaft 22. Thus, noise such as gear rattle is not generated between the slide gear 32 and the cover 24 during the lever operation.

As described above, in the brake-side clutch part 12, the structure in which the cylindrical rollers 27 are engaged with the wedge gaps 26 between the outer ring 23 and the output shaft 22 is required in addition to the structure in which the external teeth 32a of the slide gear 32 and the internal teeth 24a of the cover 24 mesh with each other.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

The invention claimed is:

1. A clutch unit, comprising:
 a lever-side clutch part, which is provided on an input side, and is configured to control transmission and interruption of a rotational torque input through a lever operation; and
 a brake-side clutch part, which is provided on an output side, and is configured to transmit the rotational torque from the lever-side clutch part to the output side, and interrupt a rotational torque reversely input from the output side,
 wherein the brake-side clutch part comprises:
  a stationary member, which is constrained in rotation;
  an output member configured to output the rotation;
  an input member, which is arranged between the stationary member and the output member, and is configured to receive the rotational torque input from the lever-side clutch part; and
  an engaging element configured to control the interruption of the rotational torque reversely input from the output member and the transmission of the rotational torque input from the input member through engagement and disengagement between the stationary member and the output member,
 wherein the input member coupled to the output member so as to be capable of transmitting the rotational torque comprises a gear member mounted thereto, which meshes with the stationary member during the interruption of the rotational torque and is released from the meshing state with the stationary member during transmission of the rotational torque,
 wherein the gear member is arranged so as to be movable in an axial direction relative to the input member of the brake-side clutch part, and
 wherein a cam mechanism configured to move the gear member in the axial direction to control the meshing with the stationary member and the release of the meshing state is interposed between the gear member and the input member of the lever-side clutch part.

2. The clutch unit according to claim 1, further comprising an elastic member configured to elastically urge the gear member in a direction of releasing the meshing state between the gear member and the stationary member interposed between the input member of the brake-side clutch part and the gear member.

3. The clutch unit according to claim 1, wherein the lever-side clutch part and the brake-side clutch part are assembled to a seat lifter part for an automobile.

* * * * *